United States Patent [19]

Gregg

[11] Patent Number: 4,857,355

[45] Date of Patent: Aug. 15, 1989

[54] SYRUP BATCHING LOOP

[75] Inventor: John A. Gregg, Pleasant Valley, N.Y.

[73] Assignee: PepsiCo Inc., Purchase, N.Y.

[21] Appl. No.: 12,942

[22] Filed: Feb. 10, 1987

[51] Int. Cl.[4] .......... A23L 2/00

[52] U.S. Cl. .......... 426/590; 426/477; 426/519; 99/323.1; 99/536; 366/136

[58] Field of Search .......... 426/477, 519, 590; 99/323.1, 536; 366/136, 137

[56] References Cited

U.S. PATENT DOCUMENTS

| | | | |
|---|---|---|---|
| 2,227,101 | 12/1940 | Meyer | 426/477 |
| 2,240,442 | 4/1941 | Paul | 426/519 |
| 2,988,450 | 6/1961 | Bulatkin | 426/590 |
| 3,174,835 | 3/1965 | Stratford | 366/136 |
| 3,661,364 | 5/1972 | Lage | 366/136 |
| 3,687,684 | 8/1972 | Wentworth et al. | 426/477 |
| 3,770,455 | 11/1973 | Van Gheluwe et al. | 426/477 |
| 3,938,537 | 2/1976 | Kalko | 426/477 |
| 4,407,431 | 10/1983 | Hutter, III | 366/137 |
| 4,497,348 | 2/1985 | Sedam | 99/323.1 |
| 4,498,784 | 2/1985 | Bernhardsson et al. | 366/136 |
| 4,517,135 | 5/1985 | Szerenyi et al. | 261/104 |
| 4,599,239 | 7/1986 | Wieland et al. | 426/590 |
| 4,621,928 | 11/1986 | Schreiber | 366/137 |

FOREIGN PATENT DOCUMENTS

| | | | |
|---|---|---|---|
| 0144969 | 9/1982 | Japan | 426/477 |
| 1054226 | 3/1986 | Japan | 426/477 |
| 0812328 | 3/1981 | U.S.S.R. | 99/323.1 |

*Primary Examiner*—Kenneth M. Schor
*Assistant Examiner*—V. Manoharan
*Attorney, Agent, or Firm*—Scully, Scott, Murphy & Presser

[57] ABSTRACT

A batch mixing process for the preparation of a beverage syrup which results in a requirement for significantly lesser quantities of water in the syrup mixing process, primarily by reducing the amount of rinse water required to rinse between the mixing of the separate components of the beverage syrup. The syrup batching loop employs a main syrup tank and a subsidiary premixing tank for premixing selected components of the beverage syrup with a quantity of water to dilute each premixed component. A feed line extends from the premixing tank to the syrup tank, such that after dilution, each diluted premixed component can be pumped therethrough from the premixing tank to the main syrup tank. A significant feature of the present invention is the utilization of a recycle line extending from the syrup mixing tank to the premixing tank, which allows recycling of the partially prepared syrup mixture from the syrup tank to the premixing tank for rinsing of the premix equipment between the individual mixing steps of the overall syrup making process. While the premixing tank is being emptied of the diluted component into the syrup tank, the premixing tank and the lines associated therewith are also being rinsed with the partially completed beverage syrup from the syrup tank, rather than with rinse water. The premixing and rinsing steps are repeated for each additional component of the beverage syrup mixture which must be premixed in that manner, such that the rinse water normally required to rinse the premixing vessel and the lines associated therewith between each different premixing step is not required.

2 Claims, 2 Drawing Sheets

SYRUP BATCHING LOOP

BACKGROUND OF THE INVENTION

1. Field of the Invention

The present invention relates generally to an improvement in a batch mixing process for a beverage syrup which results in a requirement for significantly lesser quantities of water to be used in the syrup making process, primarily by reducing the amount of rinse water required therein. In greater detail, the present invention does not employ rinse water, as in the prior art, to rinse between the separate premixing steps for the separate components of the beverage syrup.

2. Discussion of the Prior Art

A currently employed batch making premix process for the production of many contemporary soft drink beverages utilizes a preliminary process for making a beverage syrup, which is followed by a mixing of the syrup with water (commonly called "throwing the beverage"), carbonating this mixture, and then filling containers therewith.

In the preliminary process of making the syrup (containing flavor, sugar, water, various salt solid components, juice, and other liquid components), concentrated salts are typically predissolved in water utilizing a small predissolving or premixing vessel. These solutions are, in turn, added to the remaining ingredients in a larger syrup mixing tank.

The recipe for syrup utilized in many contemporary soft drink beverages incorporates therein a number of various salt components which are mixed together to form the beverage syrup. In actual practice, the salt components, and some liquid components as well, cannot be mixed together all at once because of possible gross negative chemical interactions therebetween when the salt components are present simultaneously in highly concentrated forms. Accordingly, the present state of the art dilutes one salt component at a time with water in the premixing (or predissolving) tank, and then pumps the diluted component from the premixing tank through a feed line to the already partially prepared syrup mixture in a larger syrup tank. The premixing tank and its associated feed line are then rinsed with water prior to the next step of diluting the next salt component in the premixing tank, and the rinse water is added to the already partially prepared syrup mixture in the larger syrup tank, and etc. In such a syrup making process and arrangement, the premixing tank and its feed line are rinsed with water a number of different times, which results in an overall usage of a large quantity of rinse water in the production of a given quantity of finished beverage product.

As an example of such gross chemical negative interactions, in soft drink recipes containing both potassium benzoate and citric acid, if those two components are present simultaneously in highly concentrated forms, the potassium benzoate is converted into benzoic acid crystals which settle out of the solution. Various other salt components which are utilized in contemporary syrup recipes include sodium benzoate, potassium citrate, sodium citrate, potassium sorbate, sodium sorbate, mallic acid, Aspartame, various gums such as pectin, erythorbic acid, caffeine, ascorbic acid, sorbic acid, flavorants, calcium salts, and sodium chloride. In general, these ingredients are primarily solids which are dissolved and diluted with water in the premixing or predissolving tank, and are then pumped in diluted form through the feed line into the already partially prepared syrup recipe in the syrup tank. Additional liquid ingredients include food grade acids such as phosphoric and hydrochloric acids, juices, flavorants and antifoaming agents.

Accordingly, in syrup formulas using a high number, such as five or six, such salt components therein, the premixing tank and the feed line are rinsed and flushed with water after each such component is diluted, such that the next concentrated component does not interreact with the previous component, even in a diluted form thereof. Thus, this often involves six or seven different rinsing and flushing operations after each salt component is predissolved, involving the additions of large quantities of rinse water to the syrup mixture being prepared.

Bulatkin U.S. Pat. No. 2,988,450 discloses a premix process, and contains therein a discussion of rinsing problems which arise when changing flavors. Kalko et al U.S. Pat. No. 3,938,537 discloses a premix process having both a premixing container and mixing containers, and also incorporates therein a discussion of cleaning (rinsing) steps involved therein. Wieland et al U.S. Pat. No. 4,599,239 incorporates therein several discussions of premixing steps and the considerations thereof. In summary, the prior art cited hereinabove discusses only generally the problems associated with rinsing of predissolved or premixing equipment, and does not disclose the syrup batching loop process of the present invention, or the significant advantages thereof.

SUMMARY OF THE INVENTION

Accordingly, it is a primary object of the present invention to provide a batch mixing process and arrangement for the preparation of a beverage syrup which results in a requirement for significantly lesser quantities of water in the syrup mixing process, primarily by reducing the amount of rinse water required to rinse between the mixing of the separate components of the beverage syrup.

Another object of the present invention is to provide a syrup batching loop process and arrangement which allows a bottler to throw (i.e. mix the beverage syrup with water) the beverage at a higher ratio (with more water), which is a more cost efficient operation, if available, since the syrup making portion of the overall operation is usually the most time consuming aspect of the overall beverage preparation process.

The present invention provides three very significant benefits.

1. It allows small batches to be made with formulas that do not have much "free water" therein, primarily because separate additions of water are not required for rinsing. Several formulas, especially juice containing beverages, do not have much available water in the syrup formula for rinsing between salt dissolution steps. The majority of water is introduced with the sugar and juice. As such, smaller units can only be made if the beverage is thrown at a lower ratio (e.g. 1+4 instead of 1+5—wherein 1 refers to 1 part syrup and n refers to n parts water). This alternative requires more syrup to be made per unit of finished carbonated soft drink. Syrup making is a time consuming step, and accordingly bottlers always prefer to throw the beverage at the highest ratio possible.

2. It also allows larger batches to be thrown at higher ratios than are currently employed. Less water is required in the syrup formula, and thus the beverage can be thrown at a higher ratio.

3. Another benefit is that higher Brix products can be made at normal throws (e.g. 1+5 is normal).

A further object of the subject invention is the provision of a syrup batching loop employing a main syrup tank and a subsidiary premixing tank for premixing selected components of the beverage syrup with a quantity of water to dilute the premixed component. Similar to the prior art, a feed line extends from the premixing tank to the syrup tank such that each diluted premixed component can be pumped therethrough from the premixing tank to the main syrup tank. A major feature of the present invention is the utilization of a recycle line extending from the syrup mixing tank back to the premixing tank, which allows recycling of the syrup mixture from the syrup tank to the premixing tank for rinsing of the premix equipment between the individual mixing steps of the overall syrup making process.

Pursuant to the teachings of the present invention, preferably while, but possible after, the premixing tank is emptied of the diluted component into the syrup tank to form a partially completed beverage syrup therein, the premixing tank and the lines associated therewith are rinsed with the partially completed beverage syrup from the syrup tank, rather than with added rinse water as in the prior art. The premixing and rinsing steps are repeated for each additional component of the beverage syrup mixture which must be premixed in that manner to provide a diluted component, such that the rinse water normally required to rinse the premixing vessel and the lines associated therewith between each different premixing step is eliminated. The teachings of the present invention relative to the premixing and rinsing operations are typically performed upon soft drink recipes having a plurality of separate and different salt components therein, such as five or more separate and different salt components, such that a substantial quantity of additional rinse water can be eliminated from the syrup mixture.

BRIEF DESCRIPTION OF THE DRAWINGS

The foregoing objects and advantages of the present invention for a syrup batching loop may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
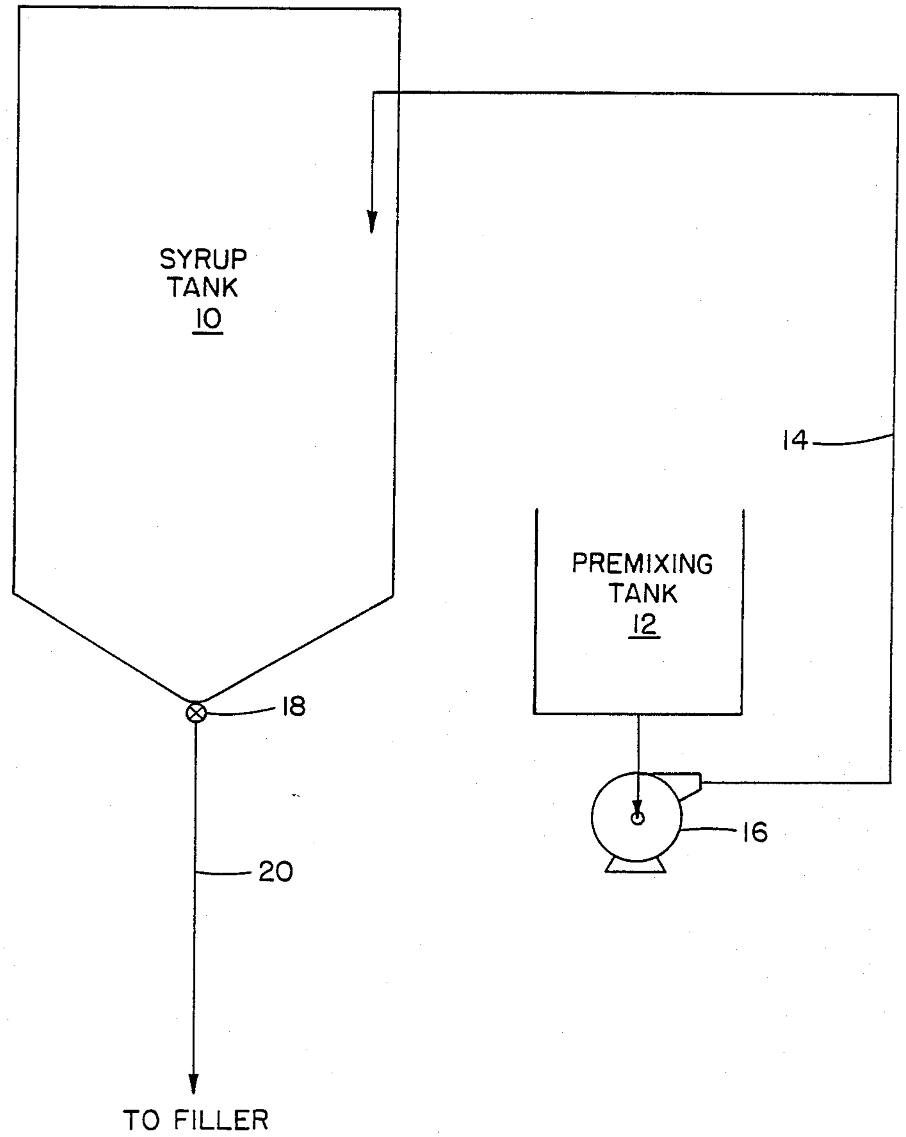
FIG.1 PRIOR ART
FIG. 1 is an exemplary embodiment of a prior art batch syrup mixing arrangement constructed pursuant to the teachings of the prior art.

FIG. 1 is an exemplary embodiment of a prior art batch syrup mixing arrangement employing a main syrup tank 10, which is typically a one to ten thousand gallon container, and a subsidiary premixing tank 12, which is typically a fifty to seven hundred and fifty (usually one hundred and fifty) gallon container. The premixing tank 12 is provided for premixing selected components of the beverage syrup with a quantity of water to dilute the premixed component, primarily to prevent negative chemical interactions that can occur between undiluted components thereof. A feed line 14 extends from the premixing tank 12 to the syrup tank 10 such that after dilution, the diluted premixed component can be pumped, such as by a conventional pump 16, from the premixing tank 12 through the feed line 14 to the main syrup tank 10. After completion of preparation of the syrup, a valve 18 to a syrup output line 20 is opened to allow the completed syrup to drain and flow to a filler for the throwing of the beverage.

The recipe for syrup utilized in many contemporary soft drink beverages incorporates therein a number of various salt components which are mixed together to form the beverage syrup. The present state of the art dilutes one salt component at a time in the premixing tank 12, and then adds the diluted component from the premixing tank 12 to the already partially prepared syrup mixture in the larger syrup tank 10. The premixing tank 12 and its feed output line 14 are then rinsed with water and the rinse water is then pumped into the syrup tank 10 prior to the next step of diluting the next salt component in the premixing tank, which is then added to the already partially prepared syrup mixture in the larger syrup tank, the rinsing step is repeated, and etc. In such a syrup making process and arrangement, the premixing tank 12 and its feed line are rinsed with water a number of different times, which results in the overall addition of a large quantity of rinse water to the syrup mixture being prepared.

Figure 2:
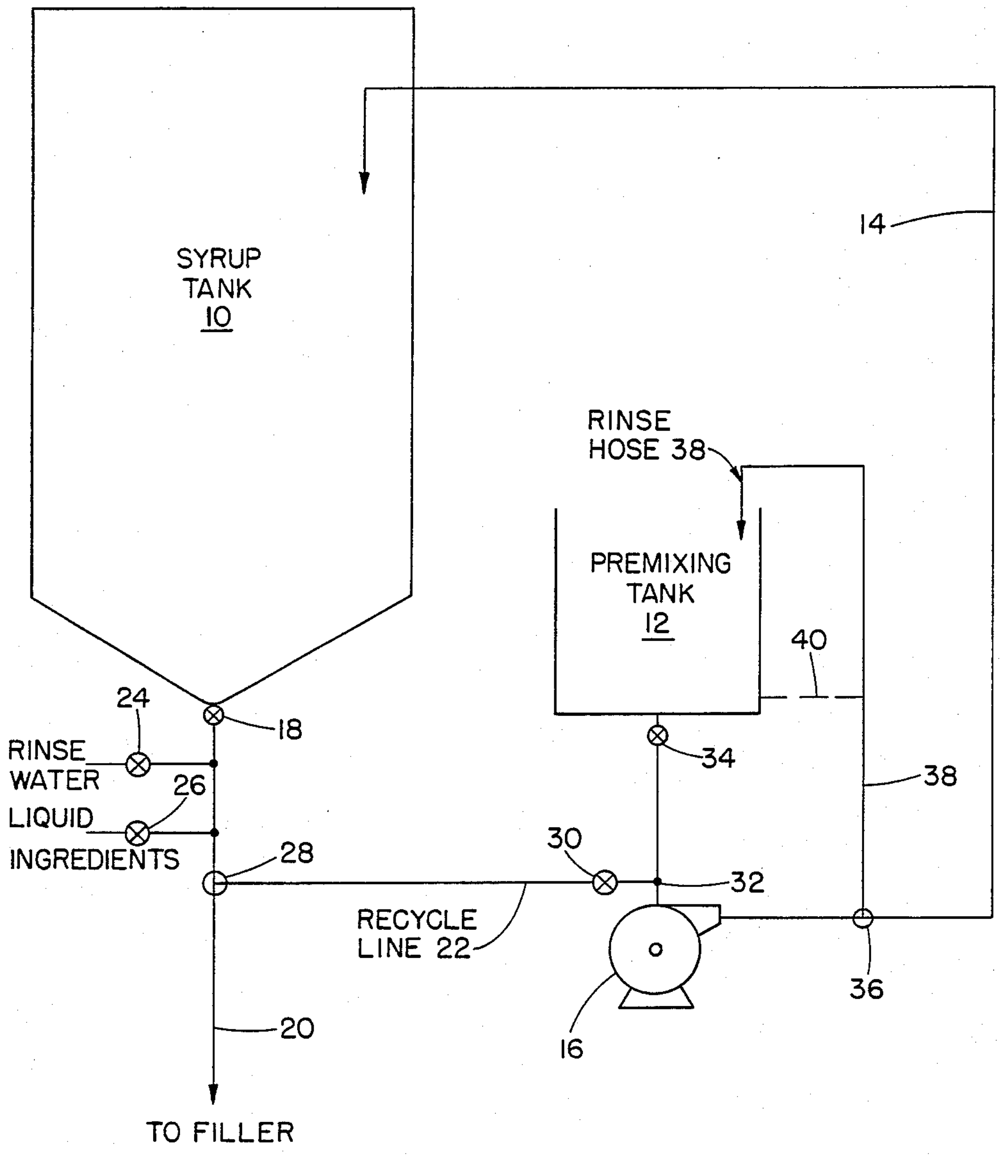
FIG. 2 illustrates an exemplary embodiment of a syrup batching loop process and arrangement constructed and operated pursuant to the teachings of the present invention.

FIG. 2 illustrates an exemplary embodiment of a syrup batching loop process and arrangement constructed and operated pursuant to the teachings of the present invention. The syrup batching loop process and arrangement of the present invention also uses a finished syrup tank 10, a mixing tank 12, and a feed line 14. A key difference between the new process and the existing operation is that a recycle or return line 22 extends from the syrup tank back to the predissolving tank, and is provided to allow a recycling of the syrup mixture from the syrup tank 10 to the premixing tank 12 for rinsing of the premixing equipment between the individual mixing steps of the overall syrup making process.

Pursuant to the teachings of the present invention, while or after the premixing tank 12 is emptied of a diluted component into the syrup tank to form a partially completed beverage syrup therein, the premixing tank 12 and the feed line 14 are rinsed with the partially completed beverage syrup from the syrup tank, rather than with added rinse water. The premixing and rinsing steps are then repeated for each additional component of the beverage syrup mixture which must be premixed in that manner to provide a diluted component, such that the rinse water normally required to rinse the premixing vessel and the output line after each different premixing step is no longer required.

Referring specifically to FIG. 2, in addition to the recycle line 22, the arrangement also includes a valve 24 to allow the addition of rinse water, which is still required after the last premixing step. A valve 26 is provided to allow the addition of liquid ingredients to be pumped through the recycle line 22 and the feed line 14 into the syrup tank 10. A three way valve 28 allows the mixture to flow to either the recycle line during preparation of the syrup or to the output line 20 after preparation of the completed syrup. A valve 30 is provided in the recycle line 22 just before a T fixture 32, and a valve 34 is provided beneath the premixing tank 12 and above the T fixture 32. A three way valve 36 is also provided in the feed line 14 at the output of the pump 16, and can direct the output of the pump either to the feed line 14 or to a rinse line 38, which may or may not include a flexible rinse hose and spray nozzle as explained hereinbelow. Many alternative piping and valving arrangements are possible and contemplated within the teachings of the present invention.

By way of further explanation, assume that a syrup making process is in progress, that the syrup tank 10 is partially filled with water and sugar as required by the particular syrup recipe, and that a first salt ingredient has been premixed in the premixing tank 12. At this time, valves 24 and 26 are closed, valve 18 is open, valve 28 is positioned to allow flow through the recycle line 22, valve 30 is open, valve 34 is closed, and valve 36 is positioned to allow flow through the feed line 14. With these valve positions, pump 16 is continuously cycling and mixing the syrup and water solution through the recycle and feed lines 22, 14. Valve 34 is then opened to allow the diluted salt solution from premixing tank 12 to flow into and gradually mix with the sugar and water solution being pumped through the recycle and feed lines 22, 14. After premixing tank 12 is empty, it is rinsed by changing the position of three way valve 36 to allow flow into the rinsing line 38.

It should be recognized that in various premixing facilities now in existence, such in different bottling plants, the arrangements of the particular syrup tank 10 and premixing tank 12 can be quite diverse. Some premixing tanks 12 are open on top and some have removable covers, such that a flexible hose can be used to spray down the interior of the premixing tank during rinsing thereof. Such an arrangement with a separate flexible rinse hose can present sanitation problems, however, as when the hose is laid down, and are not preferred. An alternative arrangement provides a return line 40 back to the premixing container such that when valve 36 is repositioned during a rinsing operation, the partially prepared syrup formula which is used for the rinsing operation simply fills the predissolving tank for rinsing thereof, after which valve 36 is repositioned to allow flow through the feed line 14 again, and valve 34 is opened to allow the rinsing solution to flow therefrom to the pump 16. After the premixing tank 12 is empty, the valve 34 is then closed, and the premixing tank 12 is then ready to receive the next ingredient to be premixed therein.

After all ingredients have been added to the syrup formula, a final rinsing step of the premixing equipment is carried out with rinse water by closing valve 18 and opening valve 24 to allow a final line rinsing with rinsing water.

The valve 26 is provided to allow some liquid ingredients to the syrup recipe to be added directly to the partially prepared syrup mixture as it is being pumped by pump 16 through the recycle and feed lines 22, 14.

The teachings of the present invention relative to the premixing and rinsing operations are typically performed upon soft drink recipes having a plurality of separate and different salt components therein, which may be as high as five or more separate and different salt components, such that the savings in required rinse water can be considerable.

A typical example of a juice containing product thrown at 1+5 is listed below.

| | Current Prior Art Process (FIG. 1) (Gallons) | Syrup Batching Loop (FIG. 2) (Gallon) |
|---|---|---|
| Available Water in Syrup Formula @ (1 + 5) Thow | 27 | 27 |
| Water Required for Dissolving Salts | 10 | 10 |
| Water Required for Rinsing Between Ingredients | 50 | 0 |
| Water Required for Rinsing Containers | 2 | 2 |
| Water Required for Initial Syrup Charging | 7 | 7 |
| Water Required for Final Line Rinsing | 20 | 8 |
| Net Water* | (62) | 27 |

*Negative value for net water indicates that this syrup is impossible to make when using the indicated process.

The present invention allows small batches of syrup to be made with formulas that do not have much free water in them, primarily because separate additions of water are not required for rinsing. Several formulas, especially juice containing beverages, do not have much available water in the syrup formula for rinsing between the salt dissolution steps. The majority of water is introduced with the sugar and juice. As such, smaller units can only be made if the beverage is thrown at a lower ratio (e.g. 1+4 instead of 1+5). This alternative requires more syrup to be made per unit of finished carbonated soft drink. Syrup making is a time consuming step, and accordingly bottlers always prefer, for economic reasons, to throw the beverage at the highest ratio possible. Moreover, the present invention also allows larger batches to be thrown at higher ratios than are currently employed. Less water is required in the syrup formula, and thus the beverage can be thrown at a higher ratio.

While a preferred embodiment and several variations of the present invention for a syrup batching loop are described in detail herein, it should be apparent that the disclosure and teachings of the present invention will suggest many alternative designs to those skilled in the art.

What is claimed is:

1. A batch mixing process for a beverage syrup which contains a number of components, including a plurality of separate and different salt components each of which must be diluted in a premixing step prior to being added to the beverage syrup mixture to prevent negative chemical interactions from occurring between undiluted components, comprising:
   - (a) mixing a partially completed beverage syrup in a syrup tank;
   - (b) premixing an additional component of the beverage syrup in a premixing tank with water to dilute the premixed component, and then adding the diluted premixed component to the partially completed beverage syrup in the syrup tank through a feed line extending from the premixing tank to the syrup tank;
   - (c) providing a recycle line which extends from the syrup tank to the premixing tank;
   - (d) rinsing the premixing vessel, the feed line extending thereto, and the recycle line, with the partially completed beverage syrup from the syrup vessel;
   - (e) repeating steps (b) and (d) at least once, said repeating steps being effected for each additional component of the beverage syrup mixture which must be premixed so as to prevent negative chemical interactions from occurring between undiluted components, such that separate additions of water for rinsing are not required.

2. A batch mixing process for a beverage syrup as claimed in claim 1, wherein the beverage syrup mixture includes a formula with at least five different salt components, on each of which steps (b) and (d) are performed.

* * * * *